(12) United States Patent
Freitag

(10) Patent No.: US 9,513,485 B2
(45) Date of Patent: Dec. 6, 2016

(54) METHOD FOR PRODUCING OPTICAL BEAM SPLITTER CUBES

(71) Applicant: SCHILDTEC GMBH, Erfurt (DE)

(72) Inventor: Hans-Joachim Freitag, Erfurt (DE)

(73) Assignee: Schildtec GmbH, Erfurt (DE)

( * ) Notice: Subject to any disclaimer, the term of this patent is extended or adjusted under 35 U.S.C. 154(b) by 0 days.

(21) Appl. No.: 14/443,335

(22) PCT Filed: Nov. 11, 2013

(86) PCT No.: PCT/EP2013/073520
§ 371 (c)(1),
(2) Date: Aug. 25, 2015

(87) PCT Pub. No.: WO2014/076037
PCT Pub. Date: May 22, 2014

(65) Prior Publication Data
US 2015/0362738 A1 Dec. 17, 2015

(30) Foreign Application Priority Data
Nov. 16, 2012 (DE) .................. 10 2012 221 011

(51) Int. Cl.
*G02B 27/10* (2006.01)
*C03B 19/02* (2006.01)
*C03B 33/06* (2006.01)
*C03C 17/06* (2006.01)

(52) U.S. Cl.
CPC ........... *G02B 27/1073* (2013.01); *C03B 19/02* (2013.01); *C03B 33/06* (2013.01); *C03C 17/06* (2013.01)

(58) Field of Classification Search
CPC .. G02B 27/1073; G03B 19/02; G03B 33/06; C03C 17/06
See application file for complete search history.

(56) References Cited

U.S. PATENT DOCUMENTS

| | | | |
|---|---|---|---|
| 5,944,401 A | 8/1999 | Murakami et al. | |
| 6,028,708 A | 2/2000 | Gramann et al. | |
| 7,463,417 B2 * | 12/2008 | Duncan ................. | C08F 265/04 359/487.04 |

FOREIGN PATENT DOCUMENTS

| | | |
|---|---|---|
| DE | 10 2011 087 846 A1 | 6/2013 |
| WO | WO 2010/025536 A1 | 3/2010 |
| WO | WO 2011/085880 A1 | 7/2011 |

OTHER PUBLICATIONS

PCT International Search Report (with translation), and Written Opinion for PCT/EP2013/073520, mailed Jan. 29, 2014, 12 pgs.

* cited by examiner

*Primary Examiner* — Mathieu Vargot
(74) *Attorney, Agent, or Firm* — Patterson Thuente Pedersen, P.A.

(57) ABSTRACT

To produce optical beam splitter cubes, an optically transparent plate is provided with an optically active layer on a cover side. Then, on both cover sides of the plate, a plurality of prism bars are formed by molding an optically transparent material, so that a double prism plate is obtained. The prism bars are arranged on cover sides of the plate projecting roof-like in ridge lines separated from each other by valleys. Each prism bar has the cross section of an isosceles right-angled triangle, complemented by the prism bar lying opposite on the other cover side of the plate to form the cross section of the beam splitter cube. The double prism plate is cut up along the valleys between the prism bars and transverse to the longitudinal direction into segments which in each case form a beam splitter cube.

23 Claims, 8 Drawing Sheets

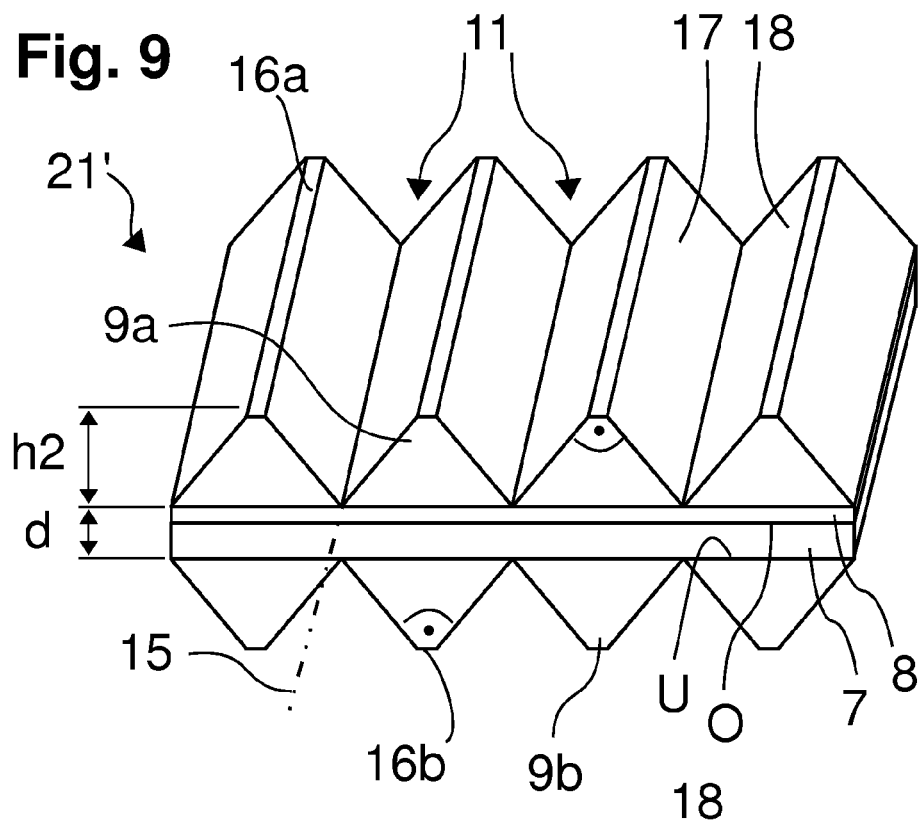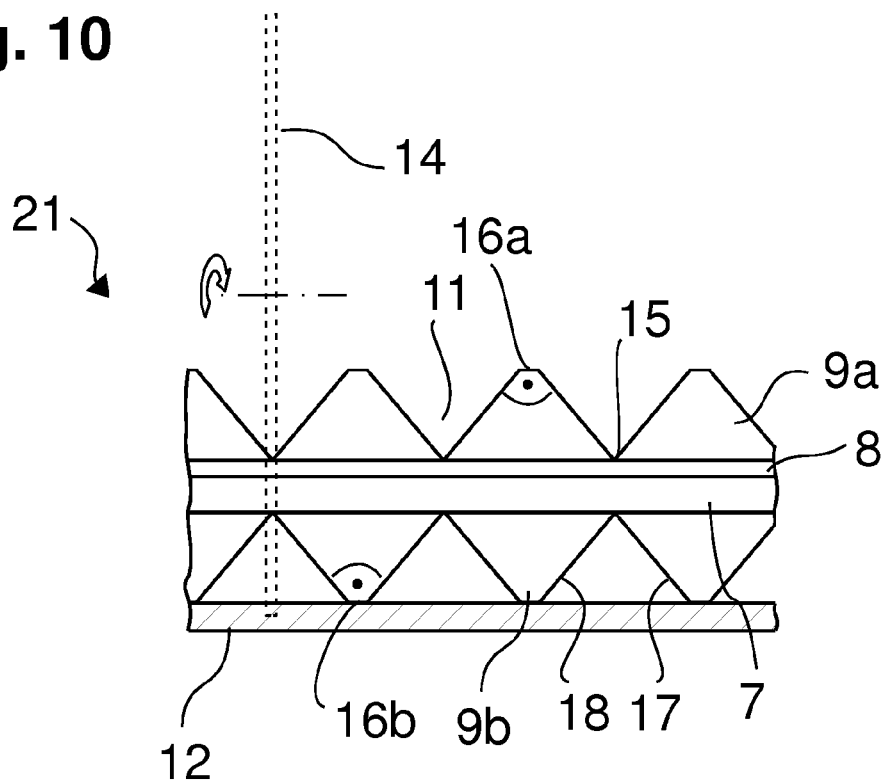

METHOD FOR PRODUCING OPTICAL BEAM SPLITTER CUBES

RELATED APPLICATIONS

The present application is a National Phase entry of PCT Application No. PCT/EP2013/073250, filed Nov. 11, 2013, which claims priority from DE Patent Application No. 10 2012 221 011.3, filed Nov. 16, 2012, said applications being hereby incorporated by reference herein in their entirety.

FIELD OF THE INVENTION

The invention relates to a method for producing optical beam splitter cubes.

BACKGROUND OF THE INVENTION

Optical beam splitter cubes are optical components by means of which a light beam can be split into two partial beams or two radiation paths can be combined into a single beam. These can be beams with different polarizations and/or different wavelengths. A particular advantage is that the transmitted beam passes through the beam splitter cube without beam displacement or beam deflection.

Until now, to produce beam splitter cubes, prisms were produced individually, optionally polished, coated and then two such prisms were cemented together at their base to produce a beam splitter cube.

However, this production is elaborate and thus expensive, which, until now, has limited the use of such beam splitter cubes almost exclusively to application cases in which the relatively high production costs are still economically justifiable. At the same time, it was not possible until now to use the splitter cubes in very cost-sensitive application cases because of their elaborate production method.

To produce optical elements, a molding method is known in the state of the art from WO 2011/085880 A1, in which a radiation-curable material, for example UV-curable plastic, is molded. With this method, optical components are produced which consist of a plurality of individual optical elements which lie next to each other, spaced apart from each other, on a substrate. The embodiment examples of the named document comprise mini-lens arrays which are molded on a glass substrate. The extent of the height of these optical elements is small compared with the thickness of the glass substrate.

U.S. Pat. No. 6,028,708 A and DE 10 2011 087 846 A1 describe a method for producing beam splitter cubes.

SUMMARY OF THE INVENTION

It is an object of the invention to specify a method for producing optical beam splitter cubes which allows a substantially more cost-effective production of these beam splitter cubes compared with the production method until now, and thus also opens up the use thereof to substantially more cost-sensitive applications compared with the possible uses until now.

According to the invention this is achieved in a method for producing optical beam splitter cubes by the following production steps:
a) an optically transparent plate is provided with an optically active layer on a cover side,
b) on both cover sides the plate is formed by molding an optically transparent material into a plurality of prism bars lying next to each other to form a double prism plate, wherein the prism bars are arranged on the cover sides of the plate projecting roof-like in ridge lines which are separated from each other by valleys following a longitudinal direction, wherein each prism bar has the cross section of an isosceles right-angled triangle and is complemented by the prism bar lying opposite it on the other cover side of the plate and by the cross section of the part of the plate lying in between opposing prism bars forming the cross section of the beam splitter cube,
c) the double prism plate is cut up along the valleys between the prism bars and is cut transverse to the longitudinal direction into segments which each form one of the beam splitter cubes.

The production method according to the invention makes it possible for the first time to produce a plurality of beam splitter cubes economically in one production stage and to avoid the separate production, usual until now, of the triangular prisms, the individual processing thereof (polishing, coating) and the cementing thereof into a single beam splitter cube, as well as the associated substantial expenditure on production.

Thus, in the invention, the basic production of double prism plates, each of which comprises a plurality of prism bars connected together, lying parallel next to each other, already creates the basis on which a plurality of beam splitter cubes can be produced simultaneously in one production stage.

The production method starts from a plate which is optically transparent. On a top side of the plate, an optically active layer is applied which forms the subsequent beam splitter layer of the beam splitter cube. Then an optically transparent material is molded on both sides of the plate, i.e. on the cover side with the optically active layer and also on the opposite cover side. A plurality of prism bars lying next to each other is thereby formed on each cover side of the plate.

The prism bars are formed on the cover side of the plate projecting roof-like as ridge lines and separated from each other by valleys following a longitudinal direction. The ridge lines can be formed as a fin or also as ridge strips.

Each prism bar corresponds in cross section to the diagonally halved cross section of the beam splitter cube, and on the cover sides the prism bars lie opposite each other such that they complement each other in pairs to form the beam splitter cube. The plate lies between the prism bars, with the result that the cross section, which in and of itself is square, of the beam splitter is complemented by a rectangular section which is moved in between on the diagonal and which is formed by the cross section of the plate. The height of each prism bar is preferably much greater than the thickness of the plate, for example at least 5 times greater. The rectangular section which is inserted into the square cross section on the diagonal and which is brought about by the plate is thereby of no further consequence for the cross section of the obtained beam splitter.

The prism bars form the right angles necessary for beam splitter geometries via the ridge lines, thus are delimited by two roof faces which converge at a right angle in the area of the ridge line. These roof faces lie at an angle of 45° relative to the surface of the plate. The basic cross section of the molded prism bars is that of a right-angled isosceles triangle, wherein the right angle lies on the ridge line and the base of the triangle is arranged at the point where the molded material and the optically transparent plate join. If the ridge line is realized as ridge strips, the point of the triangle at the right angle is flattened out.

By molding the optically transparent material onto the optically transparent plate, a double prism plate is obtained which has the mentioned prism bars on both top sides of the optically transparent plate. This double prism plate is an intermediate product. Each double prism plate produced in this way is isolated in order to form the beam splitter cube. For this, various possibilities come into consideration. One comprises the following steps:

c1) the double prism plate is detachably secured, in particular glued, to a support layer on a side with the ridge lines, projecting there, of its prism bars;

c2) then the double prism plate is cut up along the valleys between the prism bars;

c3) subsequently all the prism bars are separated perpendicular to their longitudinal direction into the segments and c4) the segments are detached from the support layer.

The double prism plates are detachably glued to an adhesive support layer on a side with the ridge lines, projecting therein, of the prism bars. The prism bars arranged on the depositing side then (detachably) adhere to the adhesive support layer along their projecting ridge lines. If, in a subsequent production process, the double prism plates are now cut up along the valleys between the prism bars, the adhesive joints on the ridge lines of the prism bars guarantee that the position of the prism bars relative to each other does not change during the separation process, with the result that a quite precise implementation of the separation processes to be carried out is ensured.

In a final production step, a disconnection of the pairs of prism bars perpendicular to their longitudinal extension into individual segments can now take place, each of which segments already represents a finished beam splitter cube, wherein during the separation process the individual prism bars are also held on the adhesive support layer here in their relative positions relative to each other by the adhesive joint on their undersides.

Thus, with one production stage in the method according to the invention, a plurality of splitter cubes can be produced simultaneously, whereby the production costs, relative to the individual splitter cube, are quite substantially reduced compared with an individual production of such splitter cubes. The fact that there is no need for a rearrangement of the individual parts in such a production also contributes to this. The advantage in terms of cost is so substantial that, for the application of such splitter cubes, fields of use for them now also open up, in which they could not be used in a way that makes sense economically until now because of their high production costs, thus e.g. in glucose-measuring sensors.

In an advantageous embodiment of the method according to the invention, on the double prism plates the prism bars are joined to at least one holding web lying perpendicular to their longitudinal extension and provided with a flat surface, at the same height as the prism bars themselves, wherein when the prism plates are cut up along the valleys between the prism bars in each case the at least one holding web is also cut through, perpendicular to its longitudinal extension, along with it.

If the individual prism bar pairs are separated from each other by these separation processes, on each of these the residual proportion of the at least one holding web remaining there during the longitudinal cut is still secured. Preferably, this is then subsequently severed in a further processing step on all prism bars perpendicular to the longitudinal direction of the prism bars, wherein as a result of the adhesive support layer the maintenance of the relative position of all the individual parts is still ensured.

The use of at least one holding web, running transverse to the prism bars, on each prism plate at the same height as the latter is not necessary, but brings the advantage, with regard to adhesion of the double prism plates on the support layer, that the contact not only takes place on the support layer along the relatively small ridge surfaces of the prism bars, but is significantly enlarged by the surface of each holding web then likewise adhesively resting on the adhesive support layer, whereby the fixing of the double prism plate to the adhesive support layer as a whole is significantly strengthened without the subsequent optical surfaces being contacted at this stage.

The question of whether such a strengthened adhesive joint to the support layer is necessary or at least desirable depends, among other things, on how the adhesive joint between ridge lines and support layer is formed.

In a quite particularly advantageous embodiment of the method according to the invention, as adhesive support layer, an auxiliary support is used, to the top side of which facing the double prism plate a layer of adhesive, deformable material, e.g. wax, is attached, into which the projecting ridge lines of the prism bars of the underside of the double prism plate facing the adhesive support layer are pressed to construct a releasable adhesive joint. For the formation of the layer on the auxiliary support, any suitable adhesive that adheres well and produces a releasable adhesive joint can be used, wherein e.g. the use of "Spezial-Kittlack C15"® from Satisloh AG, Baar, Switzerland, has particularly proved its worth. If such a suitable adhesive is used as overlay on the auxiliary support, even a slight pressing of the ridge lines of the prism bars can lead to the production of an adhesive joint which is so strong that it also securely prevents not only a slipping, but also a tilting of the prism bars, even without holding web(s), during a separation process which is carried out at right angles to the longitudinal direction of the prism bars.

In a further preferred embodiment of the method according to the invention a suitable adhesive film is used as support layer. As, however, in the case of such a use of an adhesive film the adhesive action between the latter and the ridge lines of the prism bars resting on it is somewhat smaller than in the case of an adhesive layer into which the projecting ridge lines are pressed, because a certain amount of pressing of the ridge lines into the adhesive layer is not usually possible, the production of double prism plates in which holding webs running transverse to the prism bars are also provided is recommended. Alternatively or in addition, the ridge lines can be formed as ridge strips, which provide a larger contact surface with the adhesive support layer. An increased adhesive action is achieved between the corresponding flat surface of the ridge strips or of the holding web and the adhesive film either by the ridge strips or by the holding web. This guarantees that all the cutting or separating processes used according to the invention are carried out with a good fixing of the individual parts of the double prism plates to be separated from each other during the separation processes.

In a further embodiment of the method according to the invention using holding webs on the double prism plates, after the sections of the holding web have been severed from the prism bars, the prism bars respectively joined together (in the form of the individual prism bar pairs) are taken off the adhesive film used as adhesive support layer and, in each case tilted by 45° in the same direction, positioned on a new adhesive film, laterally resting against each other and aligned with each other, before the final production step of disconnecting all the prism bars perpendicular to their longitudinal direction into segments and removing them from the adhesive support layer is then carried out.

Here, the prism bars are preferably taken off the adhesive film after the segments of the holding bar still adhering to them until then have been severed, as the separation process normally weakens the adhesive film, with the result that, afterwards, the fixing action before the final disconnection of the prism bars into the individual partial sections representing beam splitter cubes can no longer be sufficiently ensured.

By taking the prism bar pairs off the adhesive film after the segments of the at least one holding web have been severed from the prism bar pairs and by positioning the prism bar pairs on a new adhesive film, but then tilted by 45°, whereby they rest with one of their optical side faces flat on the adhesive film, for the final separation process of cutting off segments of these prism bar pairs a hold of the latter on the adhesive film can be achieved which securely guarantees a secure fixing of these prism bar pairs in their position relative to each other during the final separation process. If ridge strips are used, this step can be omitted.

In the invention, however, if an adhesive film is used, preferably only one holding web is used, which is attached to the end of the long sides of all the prism bars and into which all of these open.

To mould the prism bars, the molding method according to WO 2011/085880 A1 can preferably be used. The disclosure of this published document is incorporated into this description in full in this respect. The method described there is developed such that the prism bars are formed on both top sides of the plate by molding of the optically transparent material. This can take place in a single molding step for both top sides or in separate molding steps. As the second variant requires a precise adjustment of the first molding step to the second molding step, the molding in one step is to be preferred.

As, during the molding, prism bars, thus structures extended along the longitudinal direction, are molding on the plate, the problem of the material shrinking during the curing in the molding step is easier to overcome in the production method according to the invention than in the production of isolated lens structures or the like, such as are described in WO 2011/085880 A1. The subsequent flow of further curable material to compensate for material shrinkage during the curing is not difficult to realize along the prism bars if e.g. the shape provides for a corresponding reservoir at one or both longitudinal ends of the prism bars.

After the double prism plate has been disconnected along the valleys between the prism bars, a further intermediate product is obtained in the form of prism bars consisting of pairs of prism bars which are joined via the remainder, lying in between them, of the plate to form a prism rod which is then isolated into the individual beam splitter cubes transverse to the longitudinal direction.

For particular intended uses, the prism bars are preferably ground on at least one of their optical surfaces after production of the prism plates, wherein an additional polishing process and/or the application of an optical antireflection coating layer is sometimes also advantageous.

For the separation of the double prism plates and the prism rods, all separation methods or separators suitable for this can be used. However, saw devices, particularly preferably wafer saws, which have proved their worth for the sawing and separation of highly precise parts while complying with simultaneously particularly small separation slits, are preferably used for this. Alternatively, however, a cutting by means of a suitable laser separator can e.g. also be used.

For the separation of the double prism plate along the longitudinal direction, thus for the production of the prism rods, it is advantageous if the separation process only has to take place through the plate. For this reason, it is advantageous to form the valley floor between neighboring prism bars such that the surface of the plate (or the coated surface of the plate) freely rests against it in a strip. In this area, the separation process can then take place without the need to sever material of the prism bars.

In order, in the case of a beam splitter, not to bring about a limitation of the aperture by the material of the plate which lies between the sections, which are triangular in cross section, of the prism bars, it is preferred to offset the prism bars relative to the plate plane on the two cover sides of the plate against each other by an amount that equals the thickness of the plate. It is thus achieved that the entrance aperture of the beam splitter is not reduced, but rather is available over an amount that substantially corresponds to the cathetus length of the triangle, isosceles and right-angled in cross section, of the prisms.

In order to prevent edges of the plate from protruding, after the isolation into beam splitters, on the boundary surfaces of the beam splitter, in a development of the variant with prism bars offset against each other and spaced apart by the plate thickness as well as additionally by the disconnecting cut width the severing cut can additionally be carried out at an angle of 45°. The boundary surfaces of the resulting beam splitter which, because of the section of the plate which lies between the prisms, is no longer cubic, but rather is square. This achieves that the boundary surfaces of this beam splitter have no projections.

The optically active layers which can be used in such beam splitter cubes can advantageously have metal coatings or dielectric layers or other suitable layers.

Where indications of angle or size are given in this description, these are, naturally, to be seen within the framework of the possible manufacturing tolerance.

BRIEF DESCRIPTION OF THE DRAWINGS

The invention is explained in principle in even more detail below with the help of the drawings by way of example. There are shown in:

FIG. 9 a perspective diagonal view of a further embodiment, in which ridge lines are designed as flat ridge strips;

FIG. 10 a view similar to FIG. 3 for the embodiment of FIG. 9;

DETAILED DESCRIPTION

Figure 1:
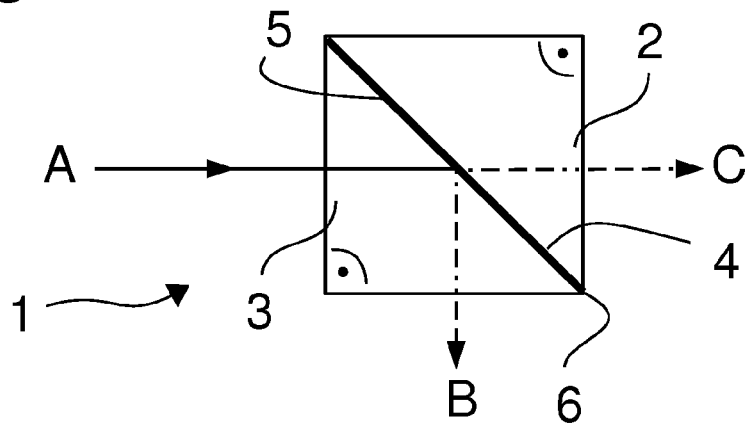
FIG. 1 a schematic side view of a beam splitter cube.

The representation of FIG. 1 shows a schematic, simplified side view of a beam splitter cube 1. This has two prisms 2, 3 which are right-angled triangles in cross section and which are laid with their base surfaces 4, 5 against each other and are cemented together by means of a cement layer.

In FIG. 1 a light beam A is also shown which is incident through an optical side face of the prism 3 into the beam splitter cube 1, wherein the base surfaces 4, 5, lying against each other, of the prisms 2, 3 lie at a 45° angle to the beam path of the incident beam A.

A portion of the light beam A is reflected at the joint plane, formed by the two base surfaces 4, 5, of the beam splitter cube 1 at an angle of 90° and emerges as a partial beam B on the other optical side face of the prism 3.

However, a portion of the entrance beam A passes through the beam splitter cube 1 and emerges from it again as partial beam C on its cube side opposite the entry side of the entrance beam A. Usually, an optically active layer 6, e.g. a metal coating, a dielectric layer or the like, is applied to one of the base surfaces 4, 5, facing each other, of the prisms 2, 3, whereby optical properties, including the intensity of the two reflected partial beams B and C, can be influenced.

Figure 2:
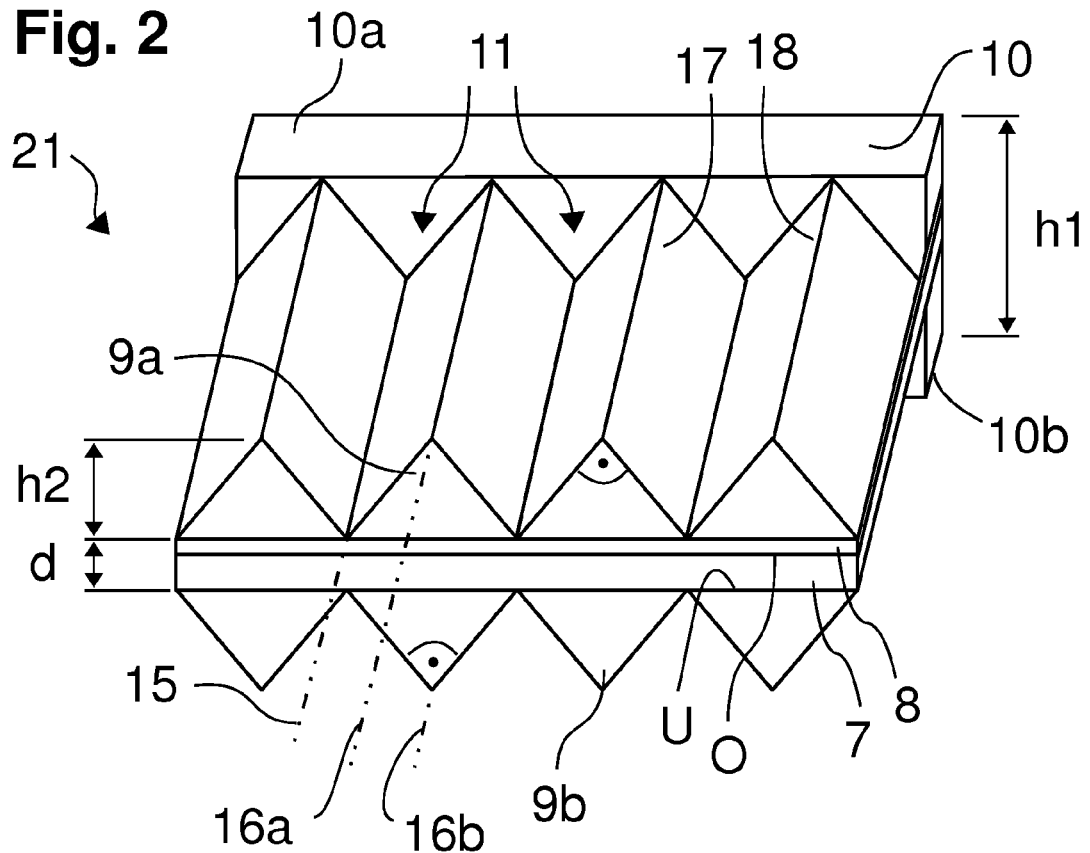
FIG. 2 a schematic perspective view of an embodiment of a double prism plate with a holding web, diagonally from the front and above.

FIG. 2 shows, in a perspective diagonal view from the front, an intermediate product in the production of a plurality of beam splitter cubes 1. The intermediate product was obtained starting from a plate 7 made of glass or another optically transmissive material. The plate 7 has an underside U and a top side O. On the top side O the plate 7 is preferably provided with an optically active layer 8 which realizes the optically active layer 6 in the subsequent beam splitter cube 1.

After the optically active layer 8 (which can, naturally, also be omitted if no optically active layer is desired in the beam splitter 1) has been applied, an optically transparent material is molding onto the top side O and the underside U of the plate 7. For this, for example, the method known from the named WO 2011/085880 A1 can be used. Glass, plastic or silicone-based substances come into consideration as materials. A plurality of prism bars 9a, b lying parallel to each other and arranged next to each other are thereby formed on the plate 7, wherein the prism bars 9a are formed on the top side O and the prism bars 9b on the underside U.

The prism bars 9a open, at the end of one of their long sides (at the top in FIG. 2), into a holding web 10 which runs transverse to them and has a flat surface 10a, b on the whole of its top side or underside. The holding web 10 is designed with a constant height h1 over the whole of its extent, wherein this height corresponds exactly to the distance between the prism bars 9a and 9b at their highest point, which is formed in each case by a ridge line 16a, 16b. The surface 10a lies with the ridge lines 16a of the prism bars 9a in a common plane. The same applies to the surface 10b and the ridge line 16b of the prism bars 9b.

Each prism bar has the shape, in cross section, of a right-angled isosceles triangle, such as corresponds to the prisms 2, 3 of FIG. 1. The material forming the prism bars 9a, 9b is therefore delimited by roof faces 17, 18.

The ridge lines 16 of the individual prism bars 9 are separated from each other by V-shaped valleys 11 in the form of corresponding incisions, wherein the individual valleys 11 in each case have a deepest valley point along a line 15. It is to be noted that this valley floor in each valley 11 in practice does not present itself as a vertex converging at an acute angle in cross section, but rather, for reasons based on production technology, can have a slight rounding which, however, is represented by the continuous lines 15 at the base of the valleys 11 in FIG. 2 for simplification. Similarly, it is possible, for reasons based on manufacturing technology, for the valleys 11 not to reach as far as the underside U or top side O of the plate 7, but to be located a little above that.

The arrangement of FIG. 2 represents a double prism plate 21 which is constructed on the plate 7. As the plate 7 in the cross section of the beam splitter 1 comes to lie between the prisms 2, 3, in some production methods the thickness d of the plate 7 is very much smaller than the height h2 of the prism bars 9 (naturally the prism bars 9a and 9b are designed at the same height, namely the height h2). Otherwise, in the representation of FIG. 1, the admissible aperture for the incident light beam A would be not just slightly, but strongly or even disruptively reduced compared with the size of the entrance surface. The plate 7 is e.g. between 0.1 and 1 mm thick, preferably 0.3 mm. The thickness of the layer 8 is negligible in contrast. The height h2 of the prism bar is preferably between 0.3 and 10 mm.

The double prism plate 21 represented in FIG. 2 is intended to represent only a partial section from a larger double prism plate. After the double prism plate 21 has been produced, as shown in FIG. 2 as a partial section, it can, if desired, be processed still further.

Thus, there is the possibility e.g., should for any reason the quality of the optical surfaces of the thus-produced double prism plate 21 not yet be sufficient for a specific application case, still of optionally grinding them, possibly polishing them and/or giving them an optical antireflection coating, for instance the roof faces 17 and 18 of the individual prism bars 9a on the top side of the double prism plate 21 or, if desired, even the base surface.

Figure 3:
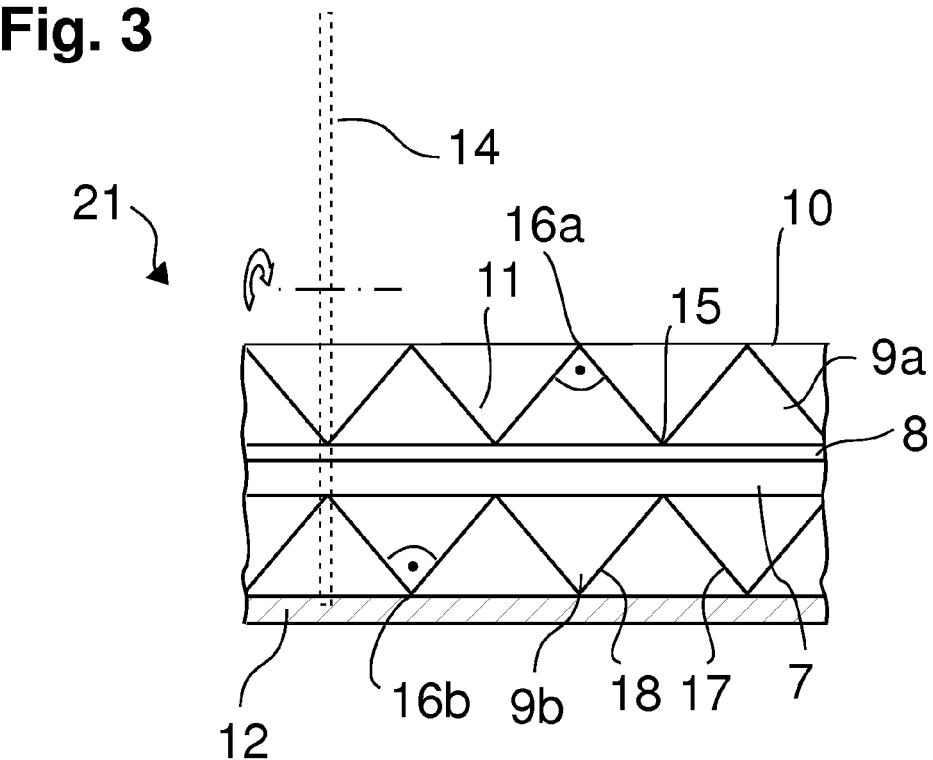
FIG. 3 a front view of a prism plate corresponding to FIG. 2 which is applied to an adhesive film, namely before the separation processes between the prism bars as well as between these and the holding web are carried out.

FIG. 3 shows, in a front view, the double prism plate 21 which is deposited with its underside on an adhesive film 12. The ridge lines 16 on the underside of the double prism plate 21, which faces the adhesive film 12, touch the adhesive film 12 and (which is not clear from FIG. 3) similarly the holding web 10 lies with its flat surface 10b likewise on the adhesive film 12.

In a further production step for producing the desired beam splitter cubes 1 the double prism plate 21 resting on the adhesive film 12 is cut in the longitudinal direction of the prism bars 9, namely along the base lines of each valley 11 between two prism bars 9, by a suitable separator 14, wherein the cut also takes place over the end of the respective valley 11 through the holding web 10 (perpendicular to its longitudinal extension), whereby each of the prism bars 9 separated from each other in this way is furthermore joined, at its end area facing the holding web 10, to the partial section of this end area produced by the cut. Due to the width of the separating element of the separator 14, during the cutting, the slight rounding at the valley floor can also be at such a distance that the inclined roof faces 17, 18 of two neighboring prism bars 9 converging there result in a flat optical surface up to the cut surface.

As a result of the contact between the individual prism bars 9 and the flat surface 10b of the holding web 10 with the adhesive film 12, during the cutting a sufficient fixing of the individual parts relative to each other is achieved, with the result that the cut can be carried out precisely, without an alteration of the relative positions of the individual parts occurring.

To carry out the separation process, any suitable separator 14 can be used. The use of a wafer saw, which allows a highly precise severing with, at the same time, an extremely small cut width and which can be adjusted during the severing such that it also cuts into the surface of the adhesive film 12 a little, but without completely cutting through the adhesive film 12, has proved to be particularly favorable for this.

If the prism bars 9 are separated from each other along the base lines 15 of the valleys 11, with a further separation process (and without the need to regroup the individual elements) a severing of all the sections of the holding webs 10 still secured to the ends of the prism bars 9 can then be carried out along the front end face of the holding web 10 by a cut made perpendicular to the longitudinal direction of the prism bars 9.

In the representation of FIG. 3 cut lines for saw blades of wafer saws are shown by dotted lines, wherein the severing of the partial sections of the holding web 10 from the prism bars 9 (after previously severing the prism bars 9 from each other) by means of the saw blade 14 is also only shown in principle.

Figure 4:
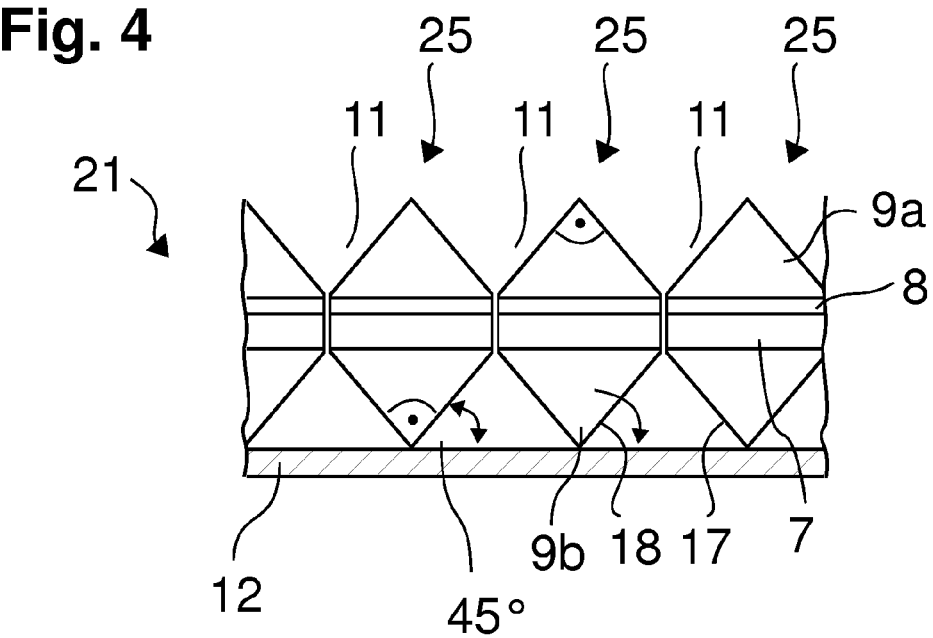
FIG. 4 schematically, the view from FIG. 3, but after the separation processes between the prism bars have been carried out and after the holding web has been severed from these.

After all the partial sections of the holding web 10 have been severed, then a state such as represented in FIG. 4 is achieved, in a front view corresponding to that of FIG. 3. The isolated prism bars 9a, 9b in each case lying opposite on the top side and underside now form prism rods 25.

As, in the prism rods 25, the two optical side faces 17, 18 of each prism converge at a right angle, this means that all the optical side faces of the prism bars 9 lying on the side of the adhesive layer 12 are inclined at an angle of 45° relative to the surface of the adhesive film 12.

Figure 5:
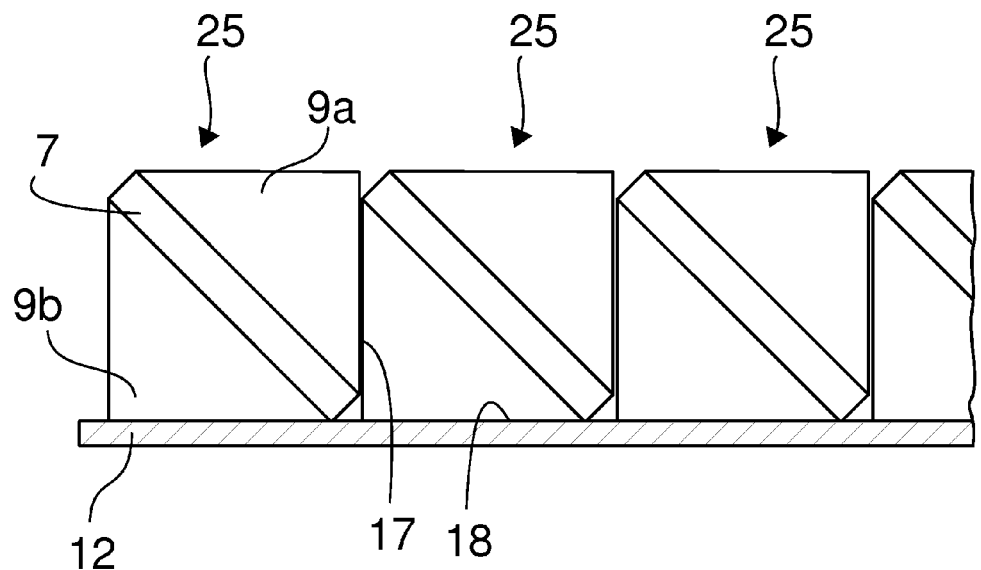
FIG. 5 the arrangement from FIG. 4, but after the individual prism bar pairs joined together have been taken off, then rotation of the latter by a tilt angle of 45° has been completed and they have been made to rest flat again on a new adhesive film.

The individual prism rods 25 are now taken off the adhesive film 12 and all, in each case tilted by 45° in the same direction of rotation, positioned on a new adhesive film 12, wherein they are arranged lying laterally against each other and parallel to each other, as represented in FIG. 5.

Through the tilting of the prism rods 25 it is achieved that, after they have again been positioned on a new adhesive film 12, all the prism bar pairs are in contact with the surface of the adhesive film 12 along in each case one optical side face of their prism bar 9 facing the adhesive film 12 and thus a flat adhesion takes place there.

The achieved flat adhesion of the individual prism rods 25 to the new adhesive film 12 produces a secure fixing during the subsequent separation process, in which the prism rods 25 lying next to each other are isolated perpendicular to their longitudinal direction to produce the desired beam splitter cubes 1. Even during this separation process the separator 14 can be set such that in each case it cuts through a complete pair of prism bars 9 joined to the respective remainder of the plate 7 and at the same time still cuts into the adhesive film 12 a little, without cutting through it completely, after which the finished beam splitter cubes 1 can then be taken off the adhesive film 12 and optionally undergo a finishing after-treatment (edge polishing or the like).

Figure 6:
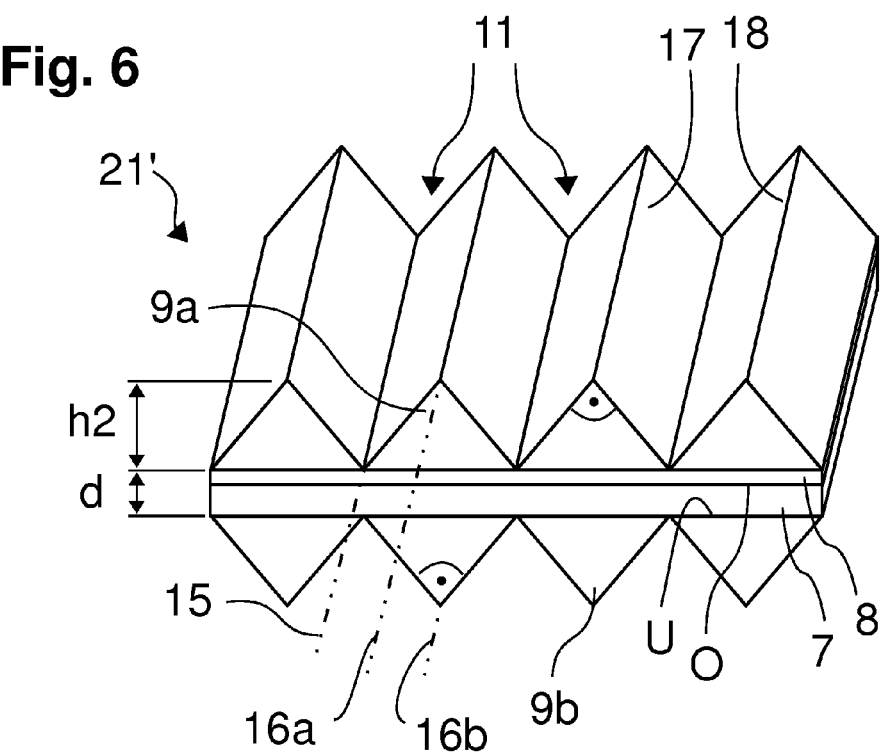
FIG. 6 a perspective diagonal view of another embodiment of a prism plate without a holding web.
Figure 7:
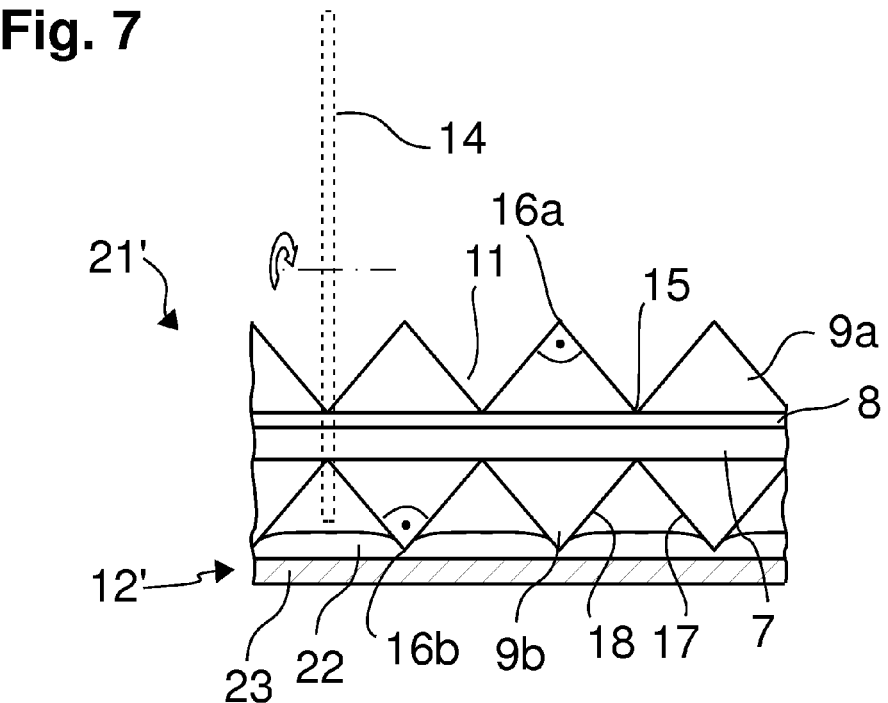
FIG. 7 a front view of a double prism plate according to FIG. 6 which is applied to an overlay made of adhesive wax, before the separation processes between the prism bars are carried out.
Figure 8:
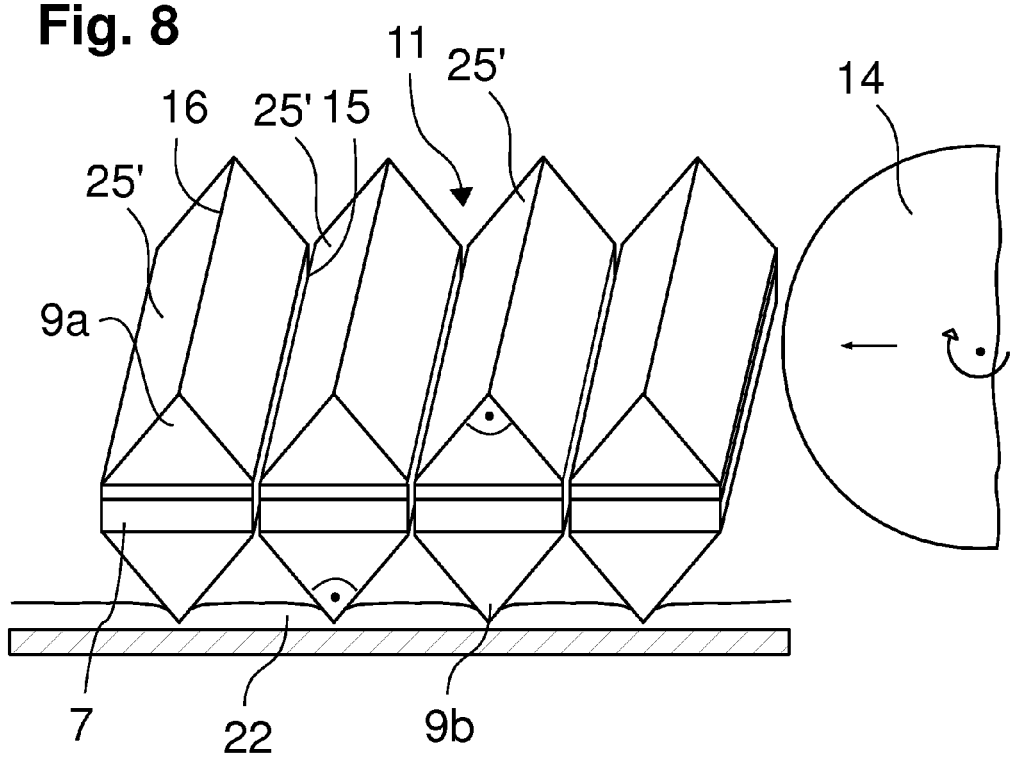
FIG. 8 schematically, the view from FIG. 7 during disconnection of the prism bar pairs into segments.

In FIGS. 6 to 8 a further embodiment example of a prism plate is shown, wherein its individual parts, insofar as they correspond to parts from the embodiment example according to FIGS. 2 to 5, are provided with the same reference numbers as there.

The double prism plate 21', as shown from the front and above in FIG. 6 in a perspective diagonal representation, differs in its formation from the double prism plate 21 corresponding to FIG. 2 only in that in the double prism plate 21' corresponding to Figs. 6 to 8 no holding web 10 is provided. Instead the double prism plate 21' only comprises the prism bars 9a, 9b arranged in parallel next to each other which thus extend over the whole length of the double prism plate 21', as FIG. 6 shows.

Apart from this difference, the design of the double prism plate 21' otherwise corresponds precisely to the design of the double prism plate 21 from FIG. 2 in its area in which the prism bars 9a, b are formed.

FIG. 7 now shows, corresponding to the representation of FIG. 3, a front view of the double prism plate 21', the prism bars 9b of which are pressed on one side with their ridges into the surface of an adhesive support layer 12' which consists of a wax layer 22 that is attached to an auxiliary support 23.

As FIG. 7 shows, the roof-like projections of the prism bars 9b are pressed on the side of the double prism plate 21' facing the adhesive support layer 12' with their projecting ridges into the wax layer 22, namely so deeply that a sufficient fixing of the double prism plate 21' is achieved.

As material for the wax layer 22, a wax with good adhesion properties is used which, with the pressed-in ridge areas of the prism bars 9b, forms a good adhesive joint which can, however, also be released again and allows a removal at the end of the production process for the beam splitter cubes 1. The pairs of prism bars 9 are joined via the respective remainder of the plate 7 and in each case form a prism rod 25'.

The "Spezial-Kittlack C/15®" from Satisloh AG, Baar, Switzerland, has proved to be a particularly suitable material for this.

The double prism plate 21' is then severed along the base lines 15 of the valleys 11 by means of a suitable separator 14, which is only shown as a dotted line in FIG. 7, in the longitudinal direction of the prism bars 9, wherein the adhesive embedding of the roof-like peaks of the prism bars in the wax layer 22 during the cutting process guarantees a fixed and unalterable relative arrangement of the individual pairs of prism bars 9 relative to each other.

If all the pairs of prism bars 9 are separated, by means of the separator 14, from each other along the base lines 15 of the valleys 11, a state which is represented in the perspective diagonal view of FIG. 8 (from the front and above) results.

The prism rods 25' still lying next to each other are now disconnected, by a separator 14, perpendicular to the longitudinal extension of the prism rods 25' into segments, wherein each segment then has the dimensions of the desired beam splitter cube 1.

If the individual prism rods 25' are all separated into segments, the segments are taken off the wax layer 22 of the adhesive support layer 12' and, optionally after a final finishing treatment (for instance polishing of the edges or the like), supplied for the desired intended use.

FIG. 9 shows a further embodiment in respect of the production of the beam splitter. Here, the ridge lines 16a, 16b are designed, not as a fin-shaped roof edge between the roof faces 17 and 18, but as ridge surfaces. This design is very possible with the mentioned molding method as, unlike e.g. stamping methods, it can produce largely sharp bends between surfaces, such as predefined by the corresponding molding tool. Otherwise, the design of FIG. 9 and the production method implemented for it correspond to that of FIG. 6.

Because of the flat ridge lines 16a, 16b, the double prism plate 21' at the ridge lines lies flat on the support layer 12, e.g. an adhesive film. A better join to the support layer 12 is thus produced, even if the ridge lines cannot be pressed into this. This better join makes it possible, after the cutting in the longitudinal direction (FIG. 10), to carry out the transverse cutting immediately, without the prism rods 25 having to be taken off and glued onto a new support layer tilted by 45°. After the slits have been produced, as can be seen in FIG. 11, the prism rods 25 can thus simply immediately be cut up into the individual beam splitters 1.

Figure 11:
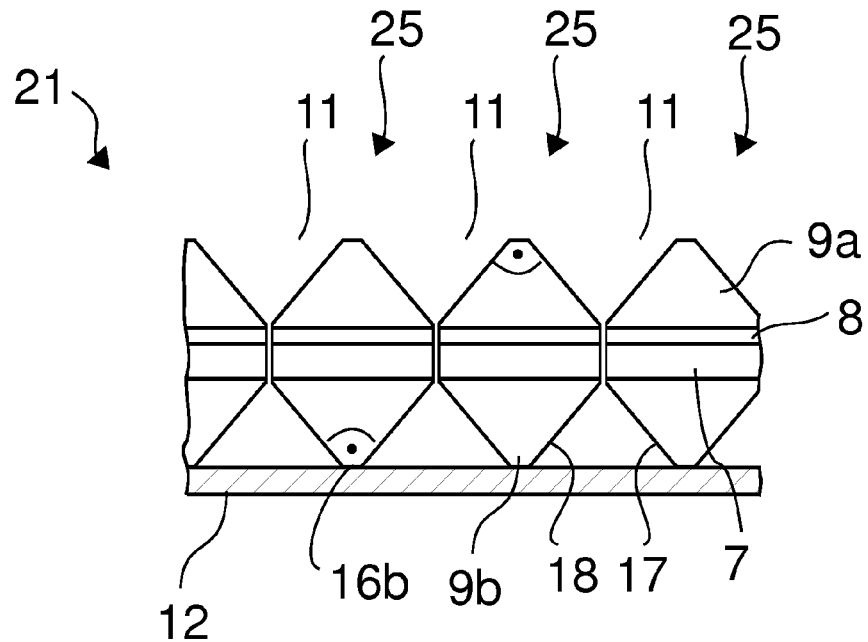
FIG. 11 a view similar to FIG. 4 for the embodiment of FIG. 9.

Naturally, the design or the production method according to FIGS. 9 to 11 can also additionally be complemented by the use of a holding web 10. In that case it is particularly advantageous if the cutting-up of the prism rods 25 is started at the longitudinal end of the prism rods which is opposite the holding web 10. The holding web 10 then ensures the particularly good adhesive joint of the prism rods 25 in the areas still to be cut up.

Figure 12:
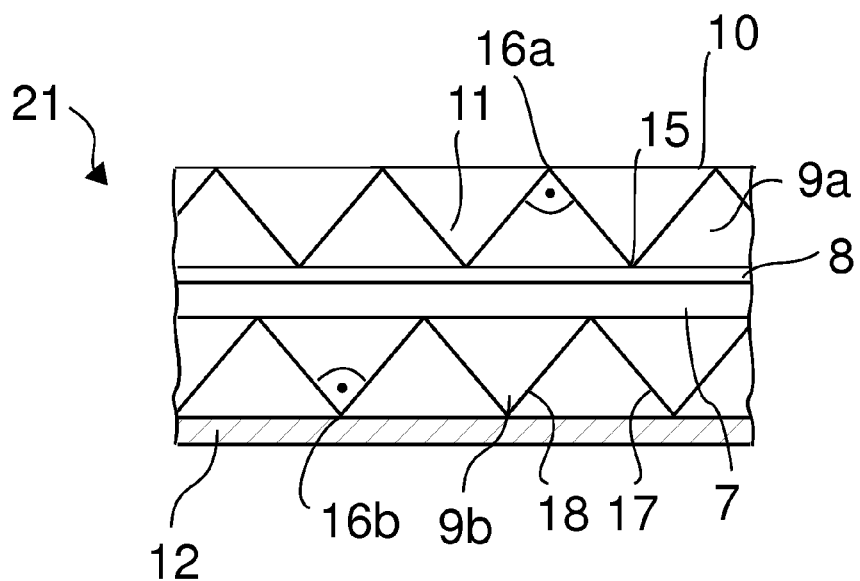
FIG. 12 a sectional representation of a double prism plate similar to that of FIGS. 2 to 4, Wherein the prism bars on one side of the plate are offset only transversely to the longitudinal direction opposite the prism bars on the opposite side of the plate.

The cross section of the beam splitter 1 produced here corresponds to the cross section of the prism bars 9a, b complemented by the cross section of the plate 7 moved in between (the thickness of the coating 8 is negligible in contrast). If the prism bars 9a on the front side O are arranged exactly opposite the prism bars 9b on the underside U, the usable beam cross section on the roof face forming the entrance surface after the isolation into beam splitters 1 is reduced by the thickness of the plate 7. In order to prevent this, it is preferred to offset the prism bars 9a on the top side O opposite the prism bars 9b on the opposite side of the plate 7 transverse to the longitudinal direction, thus laterally, by at least the thickness of the plate. FIG. 12 shows a correspondingly produced double prism plate 21. Imagine a beam which enters at the roof face provided with the reference number 17, it is easy to recognize that this beam can be incident over the whole of the roof face 17 and always passes through the structure. This will be explained further below with reference to FIG. 15.

Figure 13:
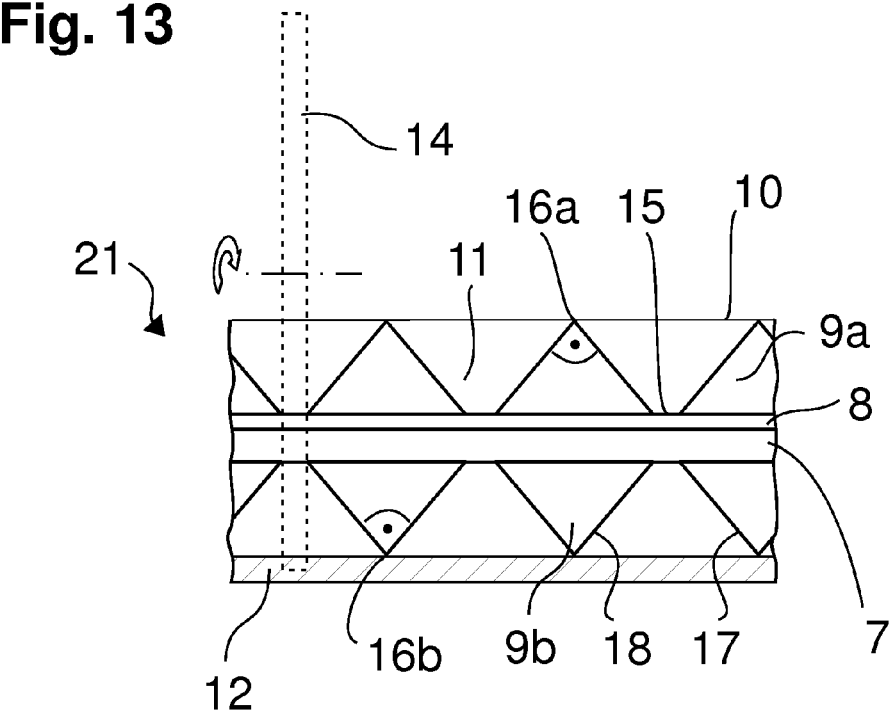
FIG. 13 a sectional representation for a production method similar to that of FIG. 12, wherein the individual prism bars are spaced apart in the longitudinal direction, in order to create a valley floor on which the separation process need not take place through the material of the prism bars, FIG. 14 a schematic representation similar to FIGS. 12 and 13 to illustrate a production method which combines features of FIGS. 12 and 13.

During the cutting of the double prism plate 21 along the longitudinal direction, in the production according to FIG. 10 the cut must be made both through the material of the prism bars 9a and 9b and through the material of the plate 7 (and the coating 8). The prism bars 9a, 9b are made of plastic, and the plate 7 of glass, in the preferred molding method according to the named publication. This material mix is problematic in the case of cutting by means of a wafer saw 14 because the plastic can clog the saw blade if saw parameters are used which are optimal for the glass plate 7. Similarly, there is a poor cutting behavior in the glass plate 7 if saw parameters which are ideal for cutting plastic are chosen. This problem is avoided if the valleys 11 are formed such that they have a flat valley floor, on which the plate 7 or the coating 8 are not concealed by the material of the prism bars 9a, b. The state arising then during the separation of the prism bars and the formation of the prism rods 25 is shown in FIG. 13. As can be seen, the saw blade 14 only has to pass through the material of the plate 7 (and the coating 8), with the result that the separation parameters, in particular saw parameters, can be optimized for this material.

The production method according to FIG. 12 and that according to FIG. 13 can be combined if the prism bars 9a, 9b provided on the opposite sides of the plate 7 are offset against each other by at least the thickness d of the plate 7 and a distance between the prism bars 9a, 9b running on one side along the longitudinal direction is additionally also provided which corresponds to the slit width during the longitudinal separation of the double prism plate into the prism rods 25. This is represented in FIG. 14.

Figure 14:
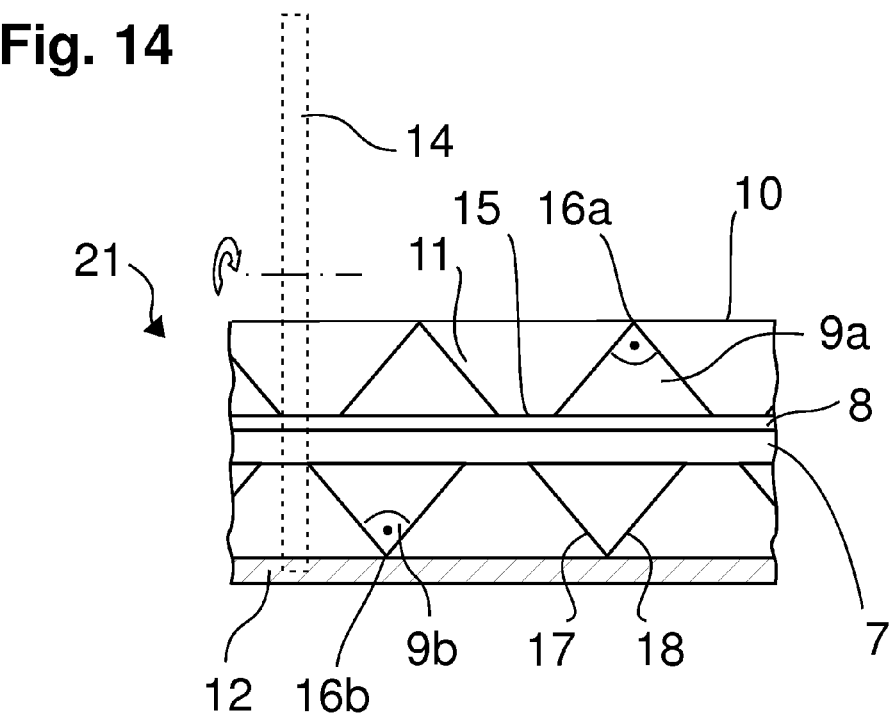
Figure 15:
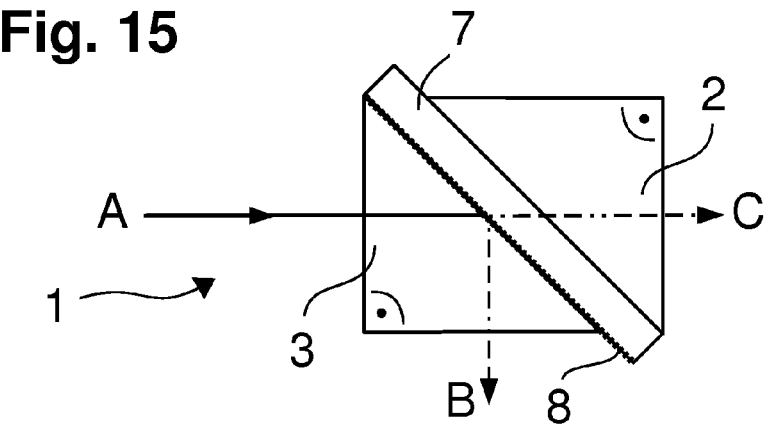
FIG. 15 a sectional representation through a beam splitter which is produced with the production method according to FIG. 1.

FIG. 15 shows a sectional representation through a beam splitter which is obtained with the production method corresponding to FIG. 14. As can be seen, the incident light beam A can be incident over the whole of the entrance surface of the prism 3, in order to be divided into the light beams B and C. Because the prism rods are offset, relative to the plane of the plate 7, laterally by the thickness d of the plate 7, they are located in the boundary line, which is horizontal in FIG. 15, of the prisms 2, 3 precisely aligned with the corresponding corner of the respective other prism 3,2.

Figure 16:
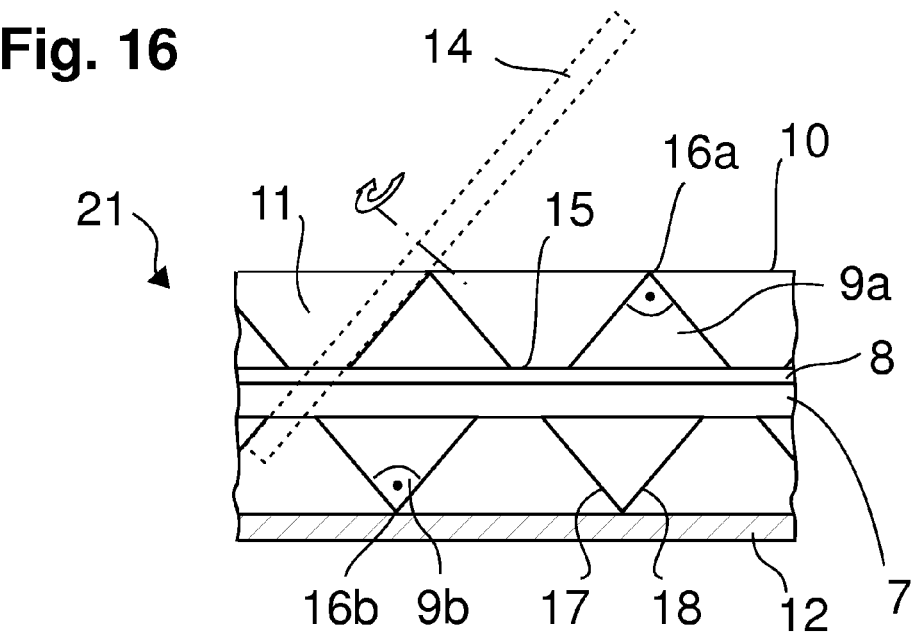
FIG. 16 a sectional representation similar to FIG. 14 for a production method modified compared with this figure and FIG. 17 a sectional representation similar to FIG. 15 for a beam splitter which is obtained with the production method according to FIG. 16.
Figure 17:
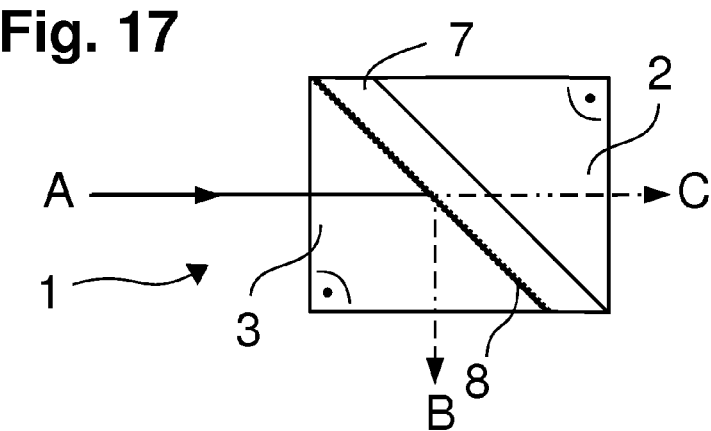

For applications in which it is desired to produce a beam splitter 1 without the projecting corners of the plate 7, for example in applications where installation space is critical, the production method according to FIG. 14 can be developed such that the cutting of the double prism plate 21 into the prism rods 25 takes place at an angle of 45°. This is illustrated by way of example in FIG. 16 by a saw blade 14 provided correspondingly inclined. A beam splitter 1 such as shown in FIG. 17 is then obtained.

Naturally, the embodiments named at the beginning can be combined. Thus it is possible to carry out the production methods in principle with or without the holding web 10. The same applies to the formation of the ridge lines 16a, 16b as a fin-shaped roof edge or as ridge strips. In particular, the production methods of FIGS. 12 to 16 can also be carried out without the holding web 10, although the holding web 10 is shown in these figures. It can be dispensed with. Similarly, in these embodiments a ridge strip can also be used as ridge line 16a, 16b.

The invention claimed is:

1. A method for producing optical beam splitter cubes which have a generally square cross section, wherein the method comprises:
    a) providing an optically transparent plate having a first cover side and opposite thereto a second cover side, the plate having an optically active layer on the first or the second cover side,
    b) forming a double prism plate by sequentially performing a first and a second molding step,
        wherein in the first molding step optically transparent material is molded onto the first cover side of the plate so as to simultaneously form a plurality of first prism bars lying in parallel next to each other and wherein in the second molding step optically transparent material is molded onto the second cover side of the plate so as to simultaneously form a plurality of second prism bars lying next to each other, wherein the first prism bars are molded opposite the second prism bars with the first and second prism bars projecting from the respective first and second cover sides in roof-like ridge lines which are separated from each other by valleys following a longitudinal direction, wherein each prism bar has the cross section of an isosceles right-angled triangle and is complemented by a prism bar lying opposite it on the other cover side of the plate, wherein the optically transparent plate and the optically active layer are sandwiched between the opposing first and second prism bars and wherein the cross section of opposing pairs of first and second prism bars and of the plate sandwiched between the opposing pairs of first and second prism bars forms the cross section of one of the beam splitter cubes; and c) producing longitudinally extending prism rods each consisting of opposing pairs of first and second prism bars and a part of the plate sandwiched in between, by cutting the double prism plate longitudinally along the valleys between the prism bars and separating the prism rods transverse to the longitudinal direction into segments which each form one of the beam splitter cubes.

2. The method according to claim 1, wherein step c) has the following sub-steps:
   c1) releasably securing the double prism plate is to a support layer;
   c2) cutting the double prism plate along the valleys between the prism bars to obtain the prism rods;
   c3) severing the prism rods transverse to their longitudinal extension into segments forming ready to use optical beam splitter cubes, and
   c4) detaching the segments from the support layer.

3. The method according to claim 2, wherein in step c1) the double prism plate is detachably glued onto the support.

4. The method according to claim 2, in which in step c1) an auxiliary carrier is used as support, the carrier comprising a top side facing the double prism plate, the top side having an overlay made of adhesive, deformable material into which the projecting ridge lines of the prism bars are pressed in to establish a releasable adhesive joint between the ridge lines of the double prism plate and the support.

5. The method according to claim 4, wherein wax is used as the deformable material.

6. The method according to claim 2, in which the step of forming the double prism plate by sequentially performing the first and second molding step includes to form a holding web to which at least one of the plurality of first or second prism bars are connected, the holding web lying perpendicular to the longitudinal direction and having at least one flat surface equal to the level of the roof-like ridge lines, wherein when the double prism plate is cut up along the valleys between the prism bars, the holding web is also cut through, perpendicular to the longitudinal direction extension.

7. The method according to claim 6, wherein the prism bars extend at one of their end sides into the holding web.

8. The method according to claim 6, in which the double prism plate comprises the at least one holding web only at one end of the plurality of prism bars.

9. The method according to claim 6, in which an adhesive film is used as support.

10. The method according to claim 6, in which, after the double prism plate and the holding web have been cut through, the sections of the holding web then still joined to the prism bars are severed, perpendicular to the longitudinal direction of the prism bars, from the prism bars and removed.

11. The method according to claim 10, in which, after the sections of the holding web have been severed from the prism rods and before severing the prism rods transversely, the prism rods are taken off the support and rotated by 45° about their longitudinal extension, positioned on a new support laterally resting against each other and aligned parallel to each other, before severing the prism bars transverse to the longitudinal direction.

12. The method according to claim 2, in which the prism bars are ground and/or provided with an antireflection coating on at least one of their surfaces after the double prism plate has been produced and before the steps c1) through c4) are performed.

13. The method according to claim 1, in which the cutting-up of the double prism plate is carried out by means of a saw.

14. The method according to claim 13, in which the saw is a wafer saw.

15. The method according to claim 1, in which the cutting-up of the double prism plate is carried out by means of a laser cutter.

16. The method according to claim 1, in which the optically active layer comprises a metal coating.

17. The method according to claim 1, in which the optically active layer comprises a dielectric layer.

18. The method according to claim 1, in which a height of the prism bars is greater than a thickness of the plate.

19. The method according to claim 18, in which the height is at least 5 times greater than the thickness.

20. The method according to claim 1, in which the first prism bars on first cover side are offset laterally opposite the second prism bars on the second cover side.

21. The method according to claim 20, in which the prism bars are offset laterally by an amount greater than or equal to the thickness of the plate.

22. The method according to claim 1, in which the valleys have a valley floor, at which the plate or the layer is exposed.

23. The method according to claim 20, in which the valley floor extends transverse to the longitudinal direction for a width equaling a thickness of the plate plus a cut width of the cutting-up in step c).

\* \* \* \* \*